(12) United States Patent
Jeong et al.

(10) Patent No.: US 12,234,959 B2
(45) Date of Patent: Feb. 25, 2025

(54) VEHICLE PROJECTION LAMP THAT IMPROVES DEFINITION OF IMAGE

(71) Applicant: IL HEUNG CO., LTD., Pocheon-si (KR)

(72) Inventors: Young Mun Jeong, Seoul (KR); Ju Young Jung, Uijeongbu-si (KR)

(73) Assignee: IL HEUNG CO., LTD., Pocheon-si (KR)

(*) Notice: Subject to any disclaimer, the term of this patent is extended or adjusted under 35 U.S.C. 154(b) by 0 days.

(21) Appl. No.: 18/817,710

(22) Filed: Aug. 28, 2024

(65) Prior Publication Data

US 2024/0418333 A1  Dec. 19, 2024

Related U.S. Application Data

(63) Continuation of application No. PCT/KR2023/015588, filed on Oct. 11, 2023.

(30) Foreign Application Priority Data

Oct. 21, 2022 (KR) .................. 10-2022-0136722

(51) Int. Cl.
| | | |
|---|---|---|
| *F21S 41/265* | (2018.01) | |
| *F21S 41/143* | (2018.01) | |
| *F21S 41/153* | (2018.01) | |
| *F21S 41/29* | (2018.01) | |

(52) U.S. Cl.
CPC .......... *F21S 41/265* (2018.01); *F21S 41/143* (2018.01); *F21S 41/153* (2018.01); *F21S 41/295* (2018.01)

(58) Field of Classification Search
CPC ...... F21S 41/265; F21S 41/295; F21S 41/143; F21S 41/153; B60Q 2400/50
See application file for complete search history.

(56) References Cited

U.S. PATENT DOCUMENTS

| | | | |
|---|---|---|---|
| 10,928,029 B1* | 2/2021 | Woo .................. | B60Q 1/34 |
| 2017/0166111 A1* | 6/2017 | Baccarin ............ | F21S 43/13 |
| 2019/0322209 A1* | 10/2019 | Sugiyama .......... | F21S 43/26 |
| 2022/0196220 A1* | 6/2022 | Choi .................. | F21S 43/26 |
| 2023/0358382 A1* | 11/2023 | Kang .................. | F21S 41/43 |

FOREIGN PATENT DOCUMENTS

| | | |
|---|---|---|
| JP | 2016134314 A | 7/2016 |
| KR | 102278382 B1 | 7/2021 |
| KR | 1020210112667 A | 9/2021 |
| KR | 1020220089942 A | 6/2022 |
| KR | 1020220132904 A | 10/2022 |
| KR | 102548052 B1 | 6/2023 |

OTHER PUBLICATIONS

Office Action of Korean Application No. 10-2022-0136722 issued Dec. 28, 2023.

* cited by examiner

*Primary Examiner* — Matthew J. Peerce
(74) *Attorney, Agent, or Firm* — Dinsmore & Shohl LLP; Yongsok Choi, Esq.

(57) ABSTRACT

Disclosed is a vehicle projection lamp that improves the definition of an image. An aspect of the present embodiment provides a vehicle projection lamp that reduces a distortion occurring in an image and improves the definition of the image when outputting the image to the ground. The projection lamp includes a light source; a substrate; a collimator located in front of the light source; a lens array unit; a fixing unit; an upper housing; and a lower housing.

4 Claims, 5 Drawing Sheets

[FIG. 1]
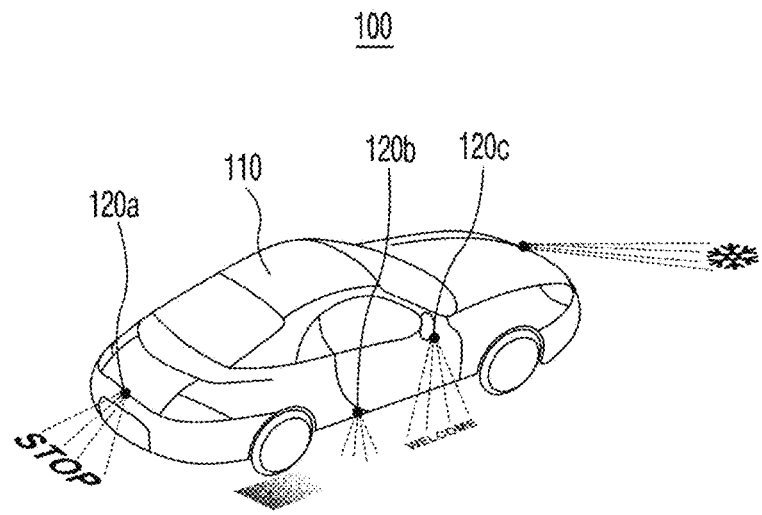
[FIG. 2]
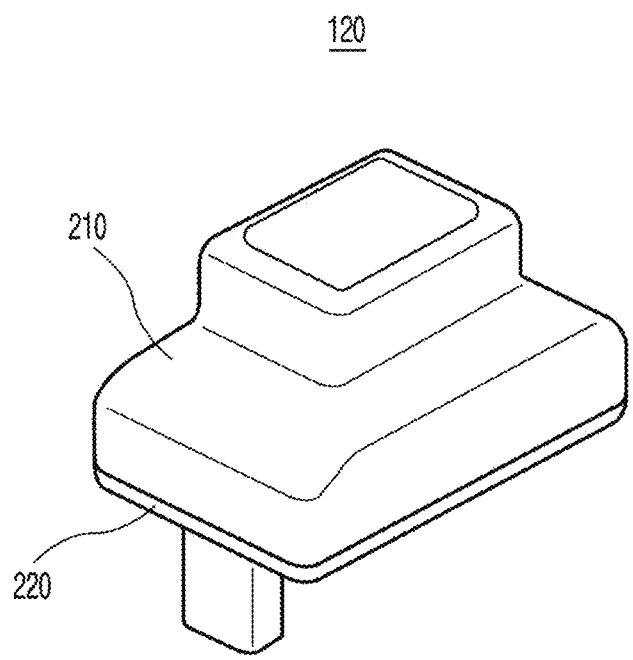

[FIG. 3]
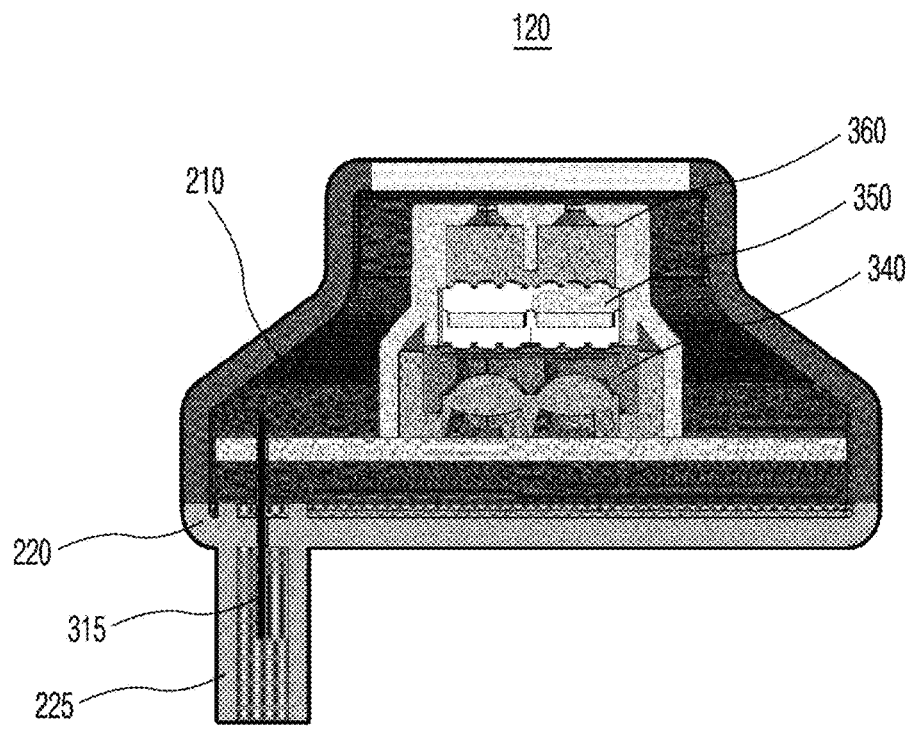

[FIG. 4]
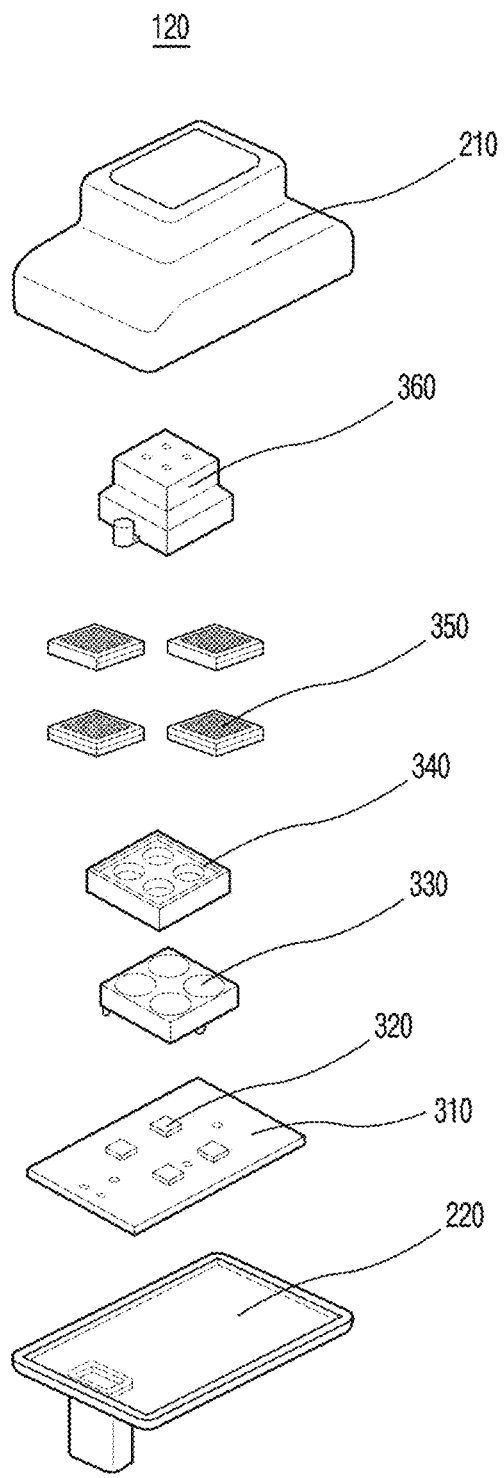

[FIG. 5A]
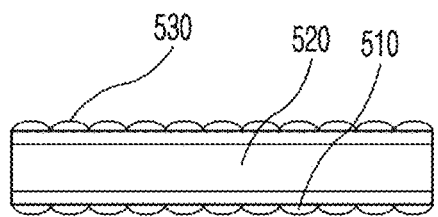
[FIG. 5B]
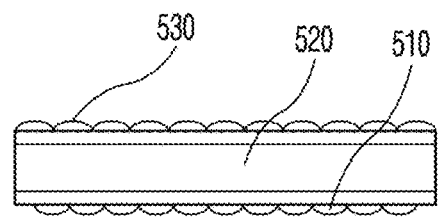
[FIG. 6]
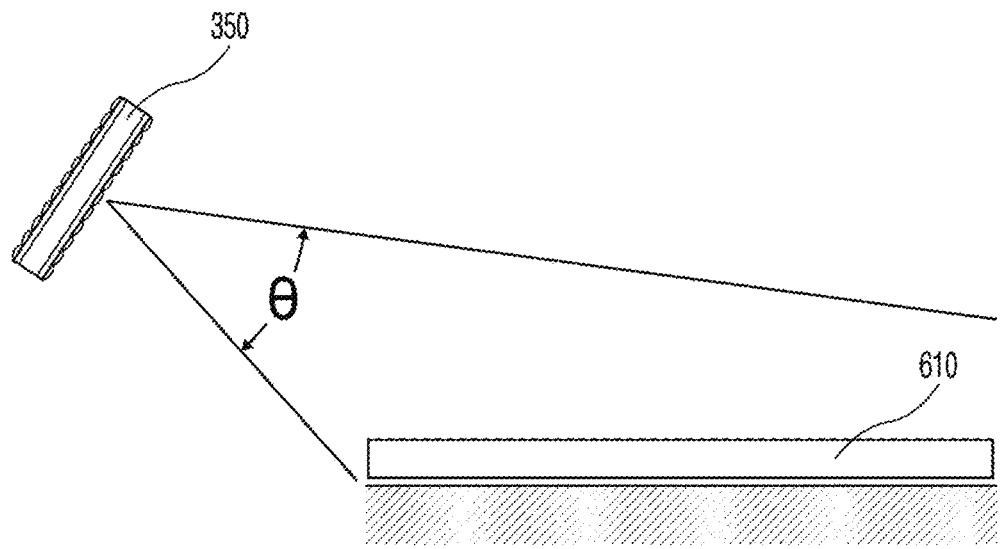

[FIG. 7]
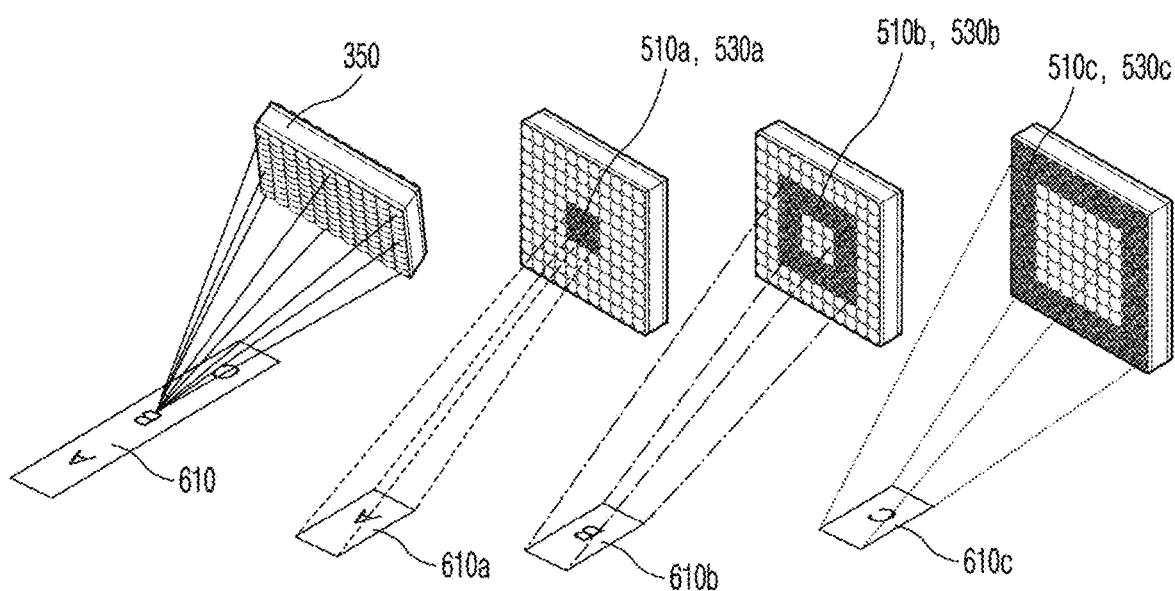
[FIG. 8]
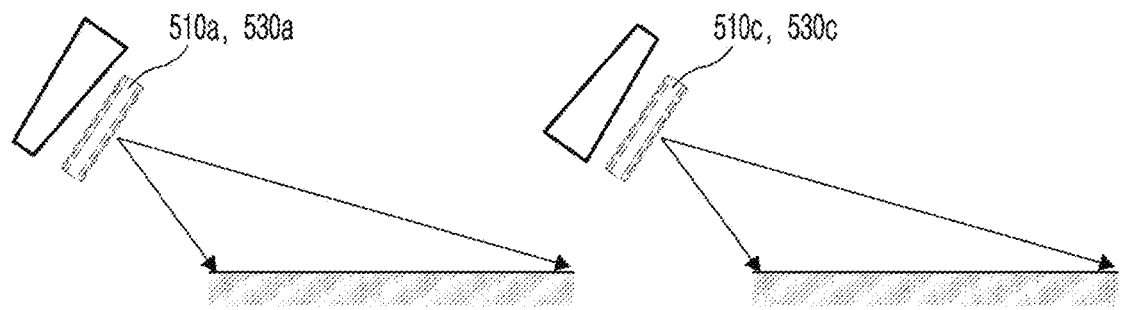

VEHICLE PROJECTION LAMP THAT IMPROVES DEFINITION OF IMAGE

CROSS-REFERENCE TO RELATED APPLICATION

The present application is a continuation of International Application No. PCT/KR2023/015588 filed on Oct. 11, 2023, which claims priority under 35 U.S.C. § 119 (a) to Korean Patent Application No. 10-2022-0136722, filed in the Korean Intellectual Property Office on Oct. 21, 2022, the entire disclosure of which is incorporated herein by reference.

BACKGROUND

1. Technical Field

The present disclosure relates to a vehicle projection lamp that improves the definition of an image to be output to the ground.

2. Related Art

Contents described in this part merely provide background information of the present embodiment, and do not constitute a conventional technology.

Vehicle projection lamps are mounted in various locations of a vehicle, such as front and rear doors or a trunk, and output specific shapes or text to the ground. The vehicle projection lamps may output vehicle names, logos, or the like to improve identification and enhance an aesthetic sense. In addition, the vehicle projection lamps output shapes suitable for various situations so that drivers, passengers, or third parties may intuitively perceive the situations.

Conventional vehicle projection lamps focus output light into a single focus on the ground by using an imaging lens and output the focused light. Accordingly, an output image is clearly observed within a certain radius based on the focus, but there is a problem in that the definition of the image is significantly reduced when it exceeds the radius.

In addition, no big problems occur when a conventional vehicle projection lamp outputs an image toward the ground from vertically above the ground. However, when the conventional vehicle projection lamp outputs an image toward the ground at a certain angle to the ground, there is a problem in that the image is distorted and output.

SUMMARY

Embodiments of the present disclosure are directed to providing a vehicle projection lamp that reduces a distortion occurring in an image and improves the definition of the image when outputting the image to the ground.

According to an aspect of the present disclosure, a projection lamp may include: a light source configured to emit light vertically upward according to a control signal; a substrate configured to allow the light source to be located thereon and to operate the light source by transmitting the control signal to the light source; a collimator located in front of the light source in a direction in which the light source emits the light, and configured to transform the light emitted by the light source into parallel light; a lens array unit configured to convert the light emitted by the light source into an image to be output, and to output the image to a ground or a floor; a fixing unit configured to fix the light source, the collimator, and the lens array unit disposed on the substrate and to prevent the light source, the collimator, and the lens array unit from moving; an upper housing configured to prevent the light source, the collimator, and the lens array unit in the projection lamp from being exposed to an external force and an external environment; and a lower housing coupled to the upper housing to dispose the light source, the collimator, and the lens array unit within the projection lamp inside the upper housing.

According to an aspect of the present disclosure, one or more light sources are included.

According to an aspect of the present disclosure, the collimator and the lens array unit are included in the same number as the number of light sources.

According to an aspect of the present disclosure, the fixing unit has the same area and height as an area and a height when the light source, the collimator, and the lens array unit are layered.

According to an aspect of the present disclosure, the fixing unit contacts an upper end surface of the upper housing through one side thereof while contacting the substrate through the other side thereof, and is fixed within the upper housing and the lower housing.

According to an aspect of the present disclosure, the projection lamp further includes a spacer located in front of the collimator in the direction in which the light source emits the light, and configured to minimize interference between the light emitted by the light source.

According to an aspect of the present disclosure, the spacer is disposed to surround a periphery of the collimator around an area through which the light travels in the collimator.

According to an aspect of the present disclosure, the lens array unit outputs images diagonally to a ground or a floor.

According to an aspect of the present disclosure, the lens array unit is divided into a plurality of sections.

According to an aspect of the present disclosure, the projection lamp is mounted on a vehicle and operates.

As described above, an aspect of the present disclosure has advantages in that it is possible to reduce a distortion occurring in an image and improve the definition of the image when outputting the image to the ground.

BRIEF DESCRIPTION OF THE DRAWINGS

FIG. 1 is a view illustrating an example of a vehicle mounted with a vehicle projection lamp according to an embodiment of the present disclosure.

FIG. 2 is a perspective view of the vehicle projection lamp according to an embodiment of the present disclosure.

FIG. 3 is a cross-sectional view of the vehicle projection lamp according to an embodiment of the present disclosure.

FIG. 4 is an exploded perspective view of the vehicle projection lamp according to an embodiment of the present disclosure.

FIGS. 5A and 5B are views illustrating a configuration of a lens array unit according to an embodiment of the present disclosure.

FIG. 6 is a schematic view illustrating a state in which an image is output to the ground through the lens array unit in the vehicle projection lamp according to an embodiment of the present disclosure.

FIG. 7 is a schematic view illustrating a state in which images are output at respective positions of the lens array unit according to an embodiment of the present disclosure.

FIG. 8 is a view illustrating images output from respective positions of the lens array unit according to an embodiment of the present disclosure.

DETAILED DESCRIPTION

The present disclosure may be changed in various ways and may have various embodiments. Specific embodiments are to be illustrated in the drawings and specifically described. It should be understood that the present disclosure is not intended to be limited to the specific embodiments, but includes all of changes, equivalents and/or substitutions included in the spirit and technical range of the present disclosure. Similar reference numerals are used for similar components while each drawing is described.

Terms, such as a first, a second, A, and B, may be used to describe various components, but the components should not be restricted by the terms. The terms are used to only distinguish one component from another component. For example, a first component may be referred to as a second component without departing from the scope of rights of the present disclosure. Likewise, a second component may be referred to as a first component. The term "and/or" includes a combination of a plurality of related and described items or any one of a plurality of related and described items.

When it is described that one component is "connected" or "coupled" to the other component, it should be understood that one component may be directly connected or coupled to the other component, but a third component may exist between the two components. In contrast, when it is described that one component is "directly connected to" or "directly coupled to" the other component, it should be understood that a third component does not exist between the two components.

Terms used in this application are used to only describe specific embodiments and are not intended to restrict the present disclosure. An expression of the singular number includes an expression of the plural number unless clearly defined otherwise in the context. In this specification, a term, such as "include" or "have", is intended to designate the presence of a characteristic, a number, a step, an operation, a component, a part, or a combination of them, and should be understood that it does not exclude the existence or possible addition of one or more other characteristics, numbers, steps, operations, components, parts, or combinations of them in advance.

All terms used herein, including technical terms or scientific terms, have the same meanings as those commonly understood by a person having ordinary knowledge in the art to which the present disclosure pertains, unless defined otherwise in the specification.

Terms, such as those defined in commonly used dictionaries, should be construed as having the same meanings as those in the context of a related technology, and are not construed as ideal or excessively formal meanings unless explicitly defined otherwise in the application.

Furthermore, each construction, process, procedure, or method included in each embodiment of the present disclosure may be shared within a range in which the constructions, processes, procedures, or methods do not contradict each other technically.

FIG. 1 is a view illustrating an example of a vehicle mounted with a vehicle projection lamp according to an embodiment of the present disclosure.

A vehicle projection lamp 120 (hereinafter, abbreviated as 'lamp') such as a vehicle lamp 120*a*, 120*b*, or 120*c*, is disposed at various positions facing the ground or floor within a vehicle 110, and outputs an image toward the ground or floor. The lamp 120 outputs, as images, vehicle's logos, phrases including specific information, or shapes representing various situations or information toward the ground or floor at various positions of the vehicle 110. As the lamp 120 includes a configuration to be described below with reference to FIGS. 2 to 5, the lamp 120 may output a high-definition image toward the ground or floor even though the lamp 120 is not necessarily located vertically above the ground or floor within the vehicle 110.

FIG. 1 illustrates that the lamp 120 is mounted on the vehicle 110 for convenience; however, the lamp 120 is not necessarily limited thereto. The vehicle 110 may be replaced with any means of transportation as long as it moves on the ground, such as a train.

FIG. 2 is a perspective view of the vehicle projection lamp according to an embodiment of the present disclosure, FIG. 3 is a cross-sectional view of the vehicle projection lamp according to an embodiment of the present disclosure, and FIG. 4 is an exploded perspective view of the vehicle projection lamp according to an embodiment of the present disclosure.

Referring to FIGS. 2 to 4, the lamp 120 according to an embodiment of the present disclosure includes an upper housing 210, a lower housing 220, a substrate 310, a light source 320, a collimator 330, a spacer 340, a lens array unit 350, and a fixing unit 360.

The upper housing 210, together with the lower housing 220, prevents each component in the lamp 120, except the housing, from being exposed to an external force and an external environment. The upper housing 210 prevents each component within the lamp 120, except for the housing, from being exposed to the external environment, especially moisture. Since the bottom of the upper housing 210 facing the lower housing 220 is in an open state, the upper housing 210 may allow each component in the lamp 120, except for the housing, to be accommodated therein, and allow the lower housing 220 to be coupled to the bottom of the upper housing 210. The upper housing 210 may be implemented in any structure as long as it has an area within which each component of the lamp 120, except for the housing, can be disposed therein.

The lower housing 220 is coupled to the upper housing 210, so that each component in the lamp 120, except for the housing, is disposed inside the housings 210 and 220 and the substrate 310 and an external control unit may be electrically connected to each other.

An upper surface (surface facing the upper housing) of the lower housing 220 has an area sufficient for seating each component in the lamp 120 except for the housing. Accordingly, each component in the lamp 120, except for the housing, may be disposed inside the housings 210 and 220.

As the lower housing 220 is laser-fused to the bottom of the upper housing 210, the external environment, especially moisture, is separated from each component inside the housing.

The lower housing 220 includes a protrusion 225 that protrudes at one position from a lower surface of the housing 220. A connector 315 electrically coupled to the substrate 310 is disposed in the protrusion 225. The connector 315 electrically coupled to the substrate 310 is disposed up to a position inside the protrusion 225, and a connector (not illustrated) having a shape complementary to the connector 315 may be inserted into the protrusion 225 from the outside and electrically coupled. For example, in the vehicle 110, the connector (not illustrated) may be electrically connected to an electronic control unit (ECU; not illustrated)) and may transmit control signals from the ECU to the substrate 310. The lower housing 220 includes the protrusion 225 so that both the connector 315 and the connector (not illustrated) may be electrically connected within the protrusion 225. As both the connectors are electrically connected, the ECU (not illustrated) may control the operation of each component within the lamp 120. Although not illustrated in FIG. 3, since a rubber packing with the same diameter as the diameter of the protrusion 225 may exist outside the connector (not illustrated), when the connector (not illustrated) is coupled to the connector 315, the protrusion 225 may also be prevented from being exposed to the external environment, especially moisture.

The substrate 310 allows the light source 320 to be located thereon and operates the light source 320 according to a control signal transmitted through the connector 315.

The light source 320 emits light vertically upward according to the control signal transmitted through the connector 315 and the substrate 310. One or more light sources 320 are included in the lamp 120, and the number of collimators 330, the number of spacers 340, and the number of lens array units 350 are determined equally according to the number of light sources 320. The light source 320 emits light vertically upward (direction in which the lens array unit is located) according to the control signal.

The collimator 330 is located in front of the light source 320 in the direction in which the light source 320 emits light, and transforms the light emitted by the light source 320 into parallel light. The light emitted by the light source 320 is inevitably physically dispersed and emitted. Accordingly, the collimator 330 is located in front of the light source 320 in the direction in which the light source 320 emits the light, and transforms the light emitted by the light source 320 into parallel light. When a plurality of light sources 320 are included in the lamp 120, a plurality of collimators 330 are also included in the lamp 120 and transform light emitted by the light sources 320 into parallel light, respectively.

The spacer 340 is located in front of the collimator 330 in the direction in which the light source 320 emits the light, and minimizes interference between the light emitted by the light source 320. Even though the collimator 330 adjusts a path to parallel light, it is difficult to transform the light into complete parallel light. Accordingly, the spacer 340 is disposed to surround the periphery of the collimator 330 around an area through which light travels in the collimator 330, thereby blocking light other than the parallel light. The spacer 340 may be more meaningful especially when at least two light sources 320 are disposed.

The lens array unit 350 is located in front of the collimator 330 in the direction in which the light source 320 emits the light, converts the light emitted by the light source 320 into an image to be output, and outputs the image to the ground or floor. In such a case, the lens array unit 350 may be disposed at a preset angle with the ground or floor to output an image at a preset angle with the ground or floor. Like the light source 320, a plurality of lens array units 350 may be included in the lamp 120. When the plurality of lens array units 350 are included in the lamp 120, the lens array units 350 may receive light emitted by the light sources 320 and convert the light into different images. For example, when the lamp 120 includes four light sources 320 and four lens array units 350, light emitted from the light sources 320 may be incident on the lens array units 350, and the lens array units 350 may convert the incident light into different images and output the different images.

Instead of focusing an image to one focus on the ground or floor like a conventional imaging lens, the lens array unit 350 is divided into a plurality of sections and focuses an image at a different focus for each section. Accordingly, the image output to the ground or floor may have uniform definition over an entire area, and an image without distortion may be output even though the image is output diagonally.

The lens array unit 350 may be implemented with a micro lens array (MLA), but is not necessarily limited thereto, and may be replaced with any configuration as long as a light path can be adjusted differently for each part. The specific structure of the lens array unit 350 and its operations described above according to the structure will be described below with reference to FIGS. 5 to 8.

The fixing unit 360 fixes the components 320, 330, 340, and 350 disposed on the substrate 310 and prevents the components from moving. The fixing unit 360 has the same area and height as the area and height when the light source 320, the collimator 330, the spacer 340, and the lens array unit 350 are layered therein. Accordingly, the fixing unit 360 disposes and fixes the light source 320, the collimator 330, the spacer 340, and the lens array unit 350 therein. On the other hand, the fixing unit 360 contacts the upper end (inner) surface of the upper housing 210 through one side thereof while contacting the substrate 310 through the other side thereof, and is fixed within the housings 210 and 220. The fixing unit 360 may be fixed within the housings 210 and 220, and may fix all the components of the lamp 120 by fixing the light source 320, the collimator 330, the spacer 340, and the lens array unit 350 therein.

FIGS. 5A and 5B are views illustrating a configuration of a lens array unit according to an embodiment of the present disclosure, FIG. 6 is a schematic view illustrating a state in which an image is output to the ground through the lens array unit in the vehicle projection lamp according to an embodiment of the present disclosure, FIG. 7 is a schematic view illustrating a state in which images are output at respective positions of the lens array unit according to an embodiment of the present disclosure, and FIG. 8 is a view illustrating images output from respective positions of the lens array unit according to an embodiment of the present disclosure.

Referring to FIGS. 5A and 5B, the lens array unit 350 according to an embodiment of the present disclosure includes a lower lens array 510 and an upper lens array 530. The lens array unit 350 may further include an image film 520.

When light enters the lens array unit 350 through the collimator 330, the lower lens array 510 serves as a lens array at a position where the incident light is first received from vertically downward, and the upper lens array 530 serves as an array that emits the light having passed through the lower lens array 510 to the floor or ground. As illustrated in FIGS. 6 and 7, in each of the lens arrays 510 and 530, a plurality of lenses are disposed in a planar array.

The same number of lenses are disposed in the lower lens array 510 and the upper lens array 530, wherein lenses facing each other between both the lens arrays 510 and 530 may be disposed on the same optical axis as illustrated in FIG. 5A or may be disposed so that the optical axes thereof are slightly twisted as being away outward from the center of the lens array unit 350. When the lenses facing each other are disposed on the same optical axis as illustrated in FIG. 5A, alignment between both the lens arrays 510 and 530 becomes easy. On the other hand, even though the collimator 330 is disposed, it is difficult to perfectly make light emitted by the light source 320 into parallel light. Accordingly, when the lenses facing each other are disposed so that the optical axes thereof are slightly twisted as being away outward from the center of the lens array unit 350 (distance between the centers of adjacent lenses is further increased in the upper lens array 530) as illustrated in FIG. 5B, both the lens arrays 510 and 530 may more smoothly adjust the path of light incident on the lens array unit 350 through the collimator 330.

The lens array unit 350 may include an image conversion unit (not illustrated) that converts incident light into an image. The image conversion unit (not illustrated) may be implemented in the form of a transparent medium such as the image film 520, or may be implemented in a form in which an image is engraved on the bottom of a lens array, especially the upper lens array 530. The incident light passes through the image engraved on the bottom of the upper lens array 530 or passes through the image film 520, and is output in the form of an image.

As illustrated in FIG. 6, an image 610 converted by both the lens arrays 510 and 530 and the image conversion unit (not illustrated) has a preset angle, and is obliquely output to the ground or floor. In such a case, in outputting an image, when each lens in the lens arrays 510 and 530 outputs the image with the same focus, a clear image is output at the focus and an area within a preset radius from the focus, but when it exceeds the preset radius, an image with relatively low definition is output. When an area of the image 610 to be output is not relatively large, the above-mentioned situation is not problematic. However, when the area of the image 610 to be output is relatively large, only a part of the image is clear and the remaining part is blurred.

In order to prevent such a problem, as illustrated in FIG. 7, each of the lens arrays 510 and 530 is divided into a plurality of sections and focuses an image to a different part for each section. First sections 510a and 530a include lenses located at the centers of the lens arrays 510 and 530 or lenses within a preset radius from the lenses located at the centers, respectively. Since light incident on the lens array unit 350 has a Gaussian distribution of intensity, light with a relatively strong intensity is incident on the first sections 510a and 530a compared to other sections. Accordingly, the first sections 510a and 530a focus a converted image to a position 610a that is relatively farthest from the lens array unit 350. The farthest position of the image may mean the position 610a located farthest from the lens array unit 350 when the image 610 is divided by the number of sections. Second sections 510b and 530b include a predetermined number of lenses located farther from the centers of the lens arrays 510 and 530 than the first sections 510a and 530a, respectively. Light with a relatively weaker intensity is incident on the second sections 510b and 530b than on the first sections 510a and 530a. Accordingly, the second sections 510b and 530b focus a converted image to a position 610b that is relatively closer to the lens array unit 350 than the position 610a focused by the first section 510a and 530a. That is, the first sections 510a and 530a, where light with the strongest intensity is incident, focus the image to a position farthest from the lens array unit 350, and a section farther away from the center based on the first sections 510a and 530a focuses the image to a position closer to the lens array unit 350. Each of the lens arrays 510 and 530 includes a plurality of sections and focuses an image to a different position for each section, so that the image 610 such as 610a, 610b, 610c can have uniform definition in all areas.

When the same image is output from each section within the lens arrays 510 and 530, a distortion occurs in which the image is different between a part close to the lens array unit 350 and a part far from the lens array unit 350. This is because the image 610 has a preset angle and is output obliquely to the ground or floor from the lens array unit 350. In order to prevent this, the image conversion unit (not illustrated) converts images differently for each section.

As illustrated in FIG. 8, the images output from the first sections 510a and 530a are output at the position farthest from the lens array unit 350, as described above with reference to FIG. 7. The images output from the first sections 510a and 530a each have the greatest width at a part to be output at a position farthest from the lens array unit 350, and have a smaller width as being closer to the lens array unit 350. On the other hand, as the distance from the first section 510a and 530a to the center of the lens arrays 510 and 530 increases, an image output from a corresponding section becomes thicker as being closer to the lens array unit 350. For example, when the lens arrays 510 and 530 are each divided into three sections, an image output from each of the first sections 510a and 530a has the greatest width at a part to be output at a position farthest from the lens array unit 350, and has a smaller width as being closer to the lens array unit 350. An image output from each of third sections 510c and 530c has the greatest width at a part to be output at a position closest to the lens array unit 350, and has a smaller width as being away from the lens array unit 350. An image output from each of the second sections 510b and 530b has an intermediate form between the images output from the first sections 510a and 530a and the images output from the third sections 510c and 530c. In this way, by outputting images of different shapes for each section, especially images with different widths depending on the distance from the lens array unit 350, distortion of the shape of the finally output image 610 can be minimized.

The above description is merely a description of the technical spirit of the present embodiment, and those skilled in the art may change and modify the present embodiment in various ways without departing from the essential characteristic of the present embodiment. Accordingly, the embodiments should not be construed as limiting the technical spirit of the present embodiment, but should be construed as describing the technical spirit of the present embodiment. The technical spirit of the present embodiment is not restricted by the embodiments. The range of protection of the present embodiment should be construed based on the following claims, and all of technical spirits within an equivalent range of the present embodiment should be construed as being included in the scope of rights of the present embodiment.

This patent is the result of research conducted in 2022 with the support of Korea Institute for Advancement of Technology with financial resources from the Government of the Republic of Korea (Ministry of Trade, Industry and Energy) (Project number: 1415183785, Detailed project number: P0022394, and Project name: Development of a dynamic image projection lamp applicable to common parts and expansion of the global supply chain).

What is claimed is:
1. A projection lamp comprising:
a plurality of light sources, each of the light sources configured to emit light according to a control signal;
a substrate configured to allow the light sources to be located thereon and to operate the light sources by transmitting the control signal to the light sources;
a collimator located in front of the light sources in a direction in which the light sources emit the lights, and configured to transform the lights emitted by the light sources into parallel lights;

a lens array unit configured to convert the lights emitted by the light sources into an image to be output, and to output the image to a ground or a floor;

a fixing unit configured to fix the light sources, the collimator, and the lens array unit disposed on the substrate and to prevent the light sources, the collimator, and the lens array unit from moving;

an upper housing configured to prevent the light sources, the collimator, and the lens array unit in the projection lamp from being exposed to an external force and an external environment;

a lower housing coupled to the upper housing to dispose the light sources, the collimator, and the lens array unit within the projection lamp inside the upper housing; and a spacer located in front of the collimator in the direction in which the light sources emit the lights, and configured to minimize interference between the lights emitted by the light sources, wherein the lens array unit outputs images to a ground or a floor, wherein the lens array unit is divided into a plurality of sections and each of the plurality of sections focuses an image at a different focus such that the image output to the ground or floor has uniform definition over an entire area, and an image without distortion is output even when the image is output, wherein each of the plurality of sections is formed to include separate lenses of the lens array unit, a first section of the plurality of sections includes lenses within a preset radius from the center of the lens array unit, the first section where light with the strongest intensity is incident compared to other sections focuses the image to a position farthest from the lens array unit, and a section farther away from the center of the lens array unit than the first section focuses the image to a position closer to the lens array unit, and wherein the spacer is disposed to surround a periphery of the collimator around an area through which the light travels in the collimator.

2. The projection lamp of claim 1, wherein the collimator and the lens array unit are included in the same number as the number of the light sources.

3. The projection lamp of claim 1, wherein the fixing unit contacts an upper end surface of the upper housing through one side thereof while contacting the substrate through the other side thereof, and is fixed within the upper housing and the lower housing.

4. The projection lamp of claim 1, wherein the projection lamp is mounted on a vehicle and operates.

* * * * *